United States Patent
Ohtomo et al.

[11] Patent Number: 6,137,568
[45] Date of Patent: Oct. 24, 2000

[54] OPTICAL AXIS COMPENSATOR

[75] Inventors: Fumio Ohtomo; Jun-ichi Kodaira; Kazuki Osaragi, all of Tokyo-to, Japan

[73] Assignee: Kabushiki Kaisha TOPCON, Tokyo-to, Japan

[21] Appl. No.: 09/120,220

[22] Filed: Jul. 21, 1998

[30] Foreign Application Priority Data

Jul. 31, 1997  [JP]  Japan .................................. 9-220135

[51] Int. Cl.$^7$ .............................. G01C 1/10; G01C 9/18
[52] U.S. Cl. .......................................... 356/149; 356/249
[58] Field of Search .................................. 356/148, 149, 356/248–250; 33/366, 377, 378, 396

[56] References Cited

U.S. PATENT DOCUMENTS

| | | | |
|---|---|---|---|
| 4,751,782 | 6/1988 | Ammann | 33/291 |
| 5,485,266 | 1/1996 | Hirano et al. | 356/249 |
| 5,517,023 | 5/1996 | Ohtomo et al. | 250/234 |
| 5,684,579 | 11/1997 | Ohtomo et al. | 356/249 |
| 5,847,824 | 12/1998 | Ohtomo et al. | 356/249 |
| 5,907,907 | 6/1999 | Ohtomo et al. | 33/291 |
| 5,933,393 | 8/1999 | Kitajima | 368/268 |

*Primary Examiner*—Frank G. Font
*Assistant Examiner*—Michael P. Stafira
*Attorney, Agent, or Firm*—Nields & Lemack

[57] ABSTRACT

The present invention provides an optical axis compensator, which comprises a liquid sealing container 1 with a transparent liquid 14 sealed therein so as to form a free liquid surface 2, an optical axis compensating unit 44 for allowing a light beam to pass through the liquid sealing container at a predetermined angle and for performing optical axis compensation based on changes of an exit optical axis according to angular change of said free liquid surface with respect to an incident optical axis, a tilting mechanism 12 for tilting said optical axis compensating unit, tilt detecting means for detecting tilt of said optical axis compensating unit, and a control unit for driving said tilting mechanism according to a signal from said tilt detecting means and for leveling said optical axis compensating unit, whereby said control unit drives said tilting mechanism according to tilt detection from the tilt detecting means and levels the optical axis compensating unit, and the optical axis compensating unit compensates a tilt angle of the optical axis.

12 Claims, 9 Drawing Sheets

PHOTODETECTION ELEMENT
DIVIDED TO FOUR PARTS

OPTICAL AXIS COMPENSATOR

BACKGROUND OF THE INVENTION

The present invention relates to an optical axis compensator used in a survey instrument or a measuring instrument for forming a horizontal or vertical reference plane or a reference plane tilted at a predetermined angle using laser beam.

In a survey instrument or a measuring instrument for forming a reference plane, an optical axis compensator has been used in the past for automatic compensation of optical axis, i.e. an optical axis compensator of liquid surface reflection type based on an absolute horizontal plane formed by liquid or an optical axis automatic compensator of liquid transmission type based on wedge-like change which occurs when liquid is tilted.

Description will be given below on a conventional type optical axis compensator of liquid surface reflection type referring to FIG. 14.

In the figure, reference numeral 1 represents a liquid sealing container provided in a main unit of the device, such as a measuring instrument, and a free liquid surface 2 is formed by a transparent liquid sealed in the liquid sealing container 1. Into the liquid sealing container 1, a light beam emitted from a light source 3 is projected to the free liquid surface 2 at a predetermined angle via a collimator lens 4, and the projected light beam is totally reflected by the free liquid surface 2. The light beam reflected by the free liquid surface 2 is then reflected in a vertical direction by a reflection mirror 11.

The free liquid surface 2 forms a horizontal plane regardless of tilting of the measuring instrument main unit. When the measuring instrument main unit is tilted, i.e. when the liquid sealing container 1 is tilted, an incident angle of the light beam entering the free liquid surface 2 is changed depending on each case. This change of the incident angle is uniquely determined by tilting of the liquid sealing container 1, and a reflection angle on the free liquid surface 2 is uniquely determined by the incident angle. Therefore, by arranging an anamorphic optical system 7 comprising prisms 5 and 6 and a beam expander 10 comprising convex lenses 8 and 9 along the optical axis of the reflected light beam, an optical axis of the reflected light beam is compensated, and a reflection optical axis always directed in a vertical direction can be obtained.

Using the vertical reflected light, a vertical reference line and a horizontal reference line can be formed, or a horizontal reference plane can be formed by rotating the horizontal reference line.

In the optical axis compensator as described above, automatic compensation of the optical axis depends upon tilting of the liquid surface and the optical system. For this reason, the range of compensation is very narrow, and the angular compensation obtained is about 10 minutes at the most. As a result, the tilting of the measuring instrument main unit must be manually compensated in advance up to a range that can be automatically compensated. Further, from the unexpected reasons, if it is out of the range of automatic compensation, it must be corrected manually each time, and this leads to troublesome procedure and poor working efficiency.

SUMMARY OF THE INVENTION

It is an object of the present invention to provide an optical axis compensator, which uses no controlling device requiring high accuracy and complicated structure, and by which it is possible to automatically compensate beyond the range of compensation by an optical system.

To attain the above object, the optical axis compensator according to the present invention comprises a liquid sealing container with a transparent liquid sealed therein so as to form a free liquid surface, an optical axis compensating unit for allowing a light beam to pass through the liquid sealing container at a predetermined angle and for performing optical axis compensation based on changes of an exit optical axis according to angular change of the free liquid surface with respect to an incident optical axis, a tilting mechanism for tilting the optical axis compensating unit, tilt detecting means for detecting tilt of the optical axis compensating unit, and a control unit for driving the tilting mechanism according to a signal from the tilt detecting means and for leveling the optical axis compensating unit. Also, the optical axis compensator according to the present invention has such an arrangement that the light beam entering the transparent liquid is reflected by the free liquid surface. Further, the optical axis compensator according to the present invention has such an arrangement that the light beam entering the transparent liquid passes through the free liquid surface. Also, in the optical axis compensator according to the present invention, the tilt detecting means comprises splitting means for splitting the light beam after passing through the transparent liquid and light detecting means for detecting the split light beam. In the optical axis compensator according to the present invention, the tilt detecting means comprises a second light projecting system for projecting a light beam to the free liquid surface at a predetermined angle and light detecting means for detecting the light beam after passing through the transparent liquid. In the optical axis compensator according to the present invention, the tilt detecting means is a tilt detector using a bubble tube. Further, in the optical axis compensator according to the present invention, the light detecting means comprises a photodetection unit divided into four parts. In the optical axis compensator according to the present invention, the light detecting means has a condenser lens for converging the light beam after passing through the transparent liquid toward the photodetection unit, and the condenser lens comprises a convex lens and an aperture lens. In the optical axis compensator according to the present invention, the light detecting means has a diffusion plate, and the photodetection unit detects light through the diffusion plate. In the optical axis compensator according to the present invention, the control unit comprises light quantity identifying means for identifying light quantity from the light detecting means and position identifying means for detecting a position of the light beam according to a signal from the photodetection unit divided into four parts, and the tilting mechanism is driven according to the results identified by the light quantity identifying means and the position identifying means. In the optical axis compensator of the present invention, the tilting mechanism supports the optical axis compensating unit at three points, the optical axis compensating unit can be freely tilted around one of the three points as a supporting point, and the remaining two supporting points can be independently displaced in upward or downward directions. In the optical axis compensator according to the present invention, each of the two supporting points comprises a first screw rod and a second screw rod respectively, and nuts screwed into the first screw rod and the second screw rod are rotated by a first tilting motor and a second tilting motor respectively, and the first tilting motor and the second tilting motor are driven and controlled by the control unit.

The control unit drives the tilting mechanism according to the result of tilt detection by the tilt detecting means, and levels the optical axis compensating unit, and the optical axis compensating unit optically compensates a tilt angle of the optical axis.

After passing through the transparent liquid via the free liquid surface, the angle of the light beam on the liquid surface is changed with respect to an incident axis. Then, the angle of an exit optical axis is changed, and a projection position on the photodetection unit is shifted. By detecting the projection position on the photodetection unit, the tilting of the optical axis compensating unit can be identified. Based on the identified result, the tilting mechanism is driven and controlled, and the optical axis compensating unit is leveled.

The photodetection element is divided into four parts. By identifying as to which photodetection unit thus divided the photodetection signal enters, it is possible to immediately obtain control information of the tilting mechanism. In case the light beam is projected to two or more photodetection units, control information of the tilting mechanisms can be obtained by comparing light quantity between the photodetection units. An aperture lens combined with a convex lens further refracts the light beam that has passed through the peripheral portion of the convex lens, and area of the photodetection unit can be reduced. In case the area of the light source is small, the diffusion plate of the light detecting means can enlarge the area of the projected image and can improve the resolution for detecting position of the projected image.

DETAILED DESCRIPTION OF THE PREFERRED EMBODIMENTS

In the following, description will be given on embodiments of the present invention referring to the attached drawings.

Figure 1:
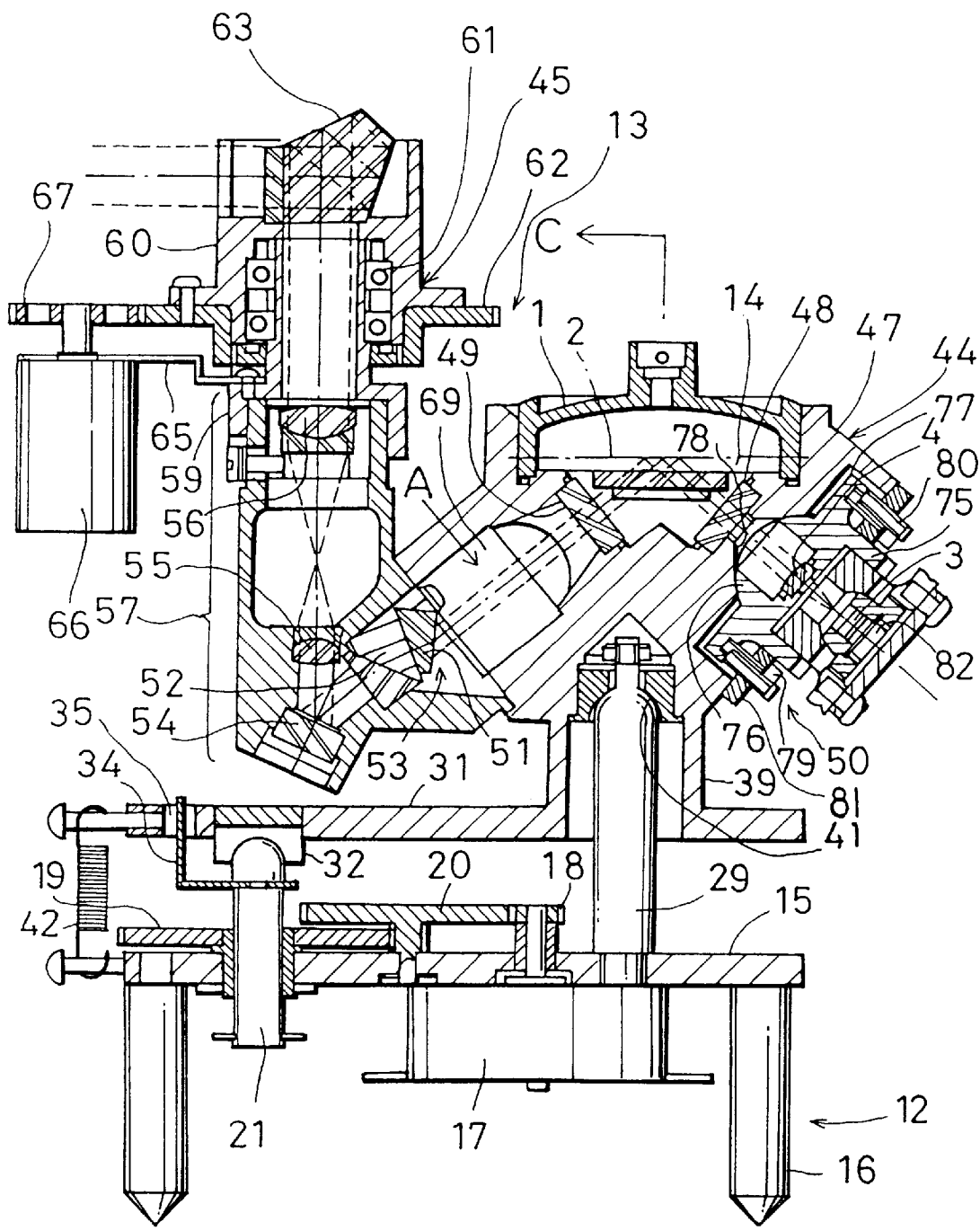
FIG. 1 is a vertical sectional view of an embodiment of the present invention.
Figure 2:
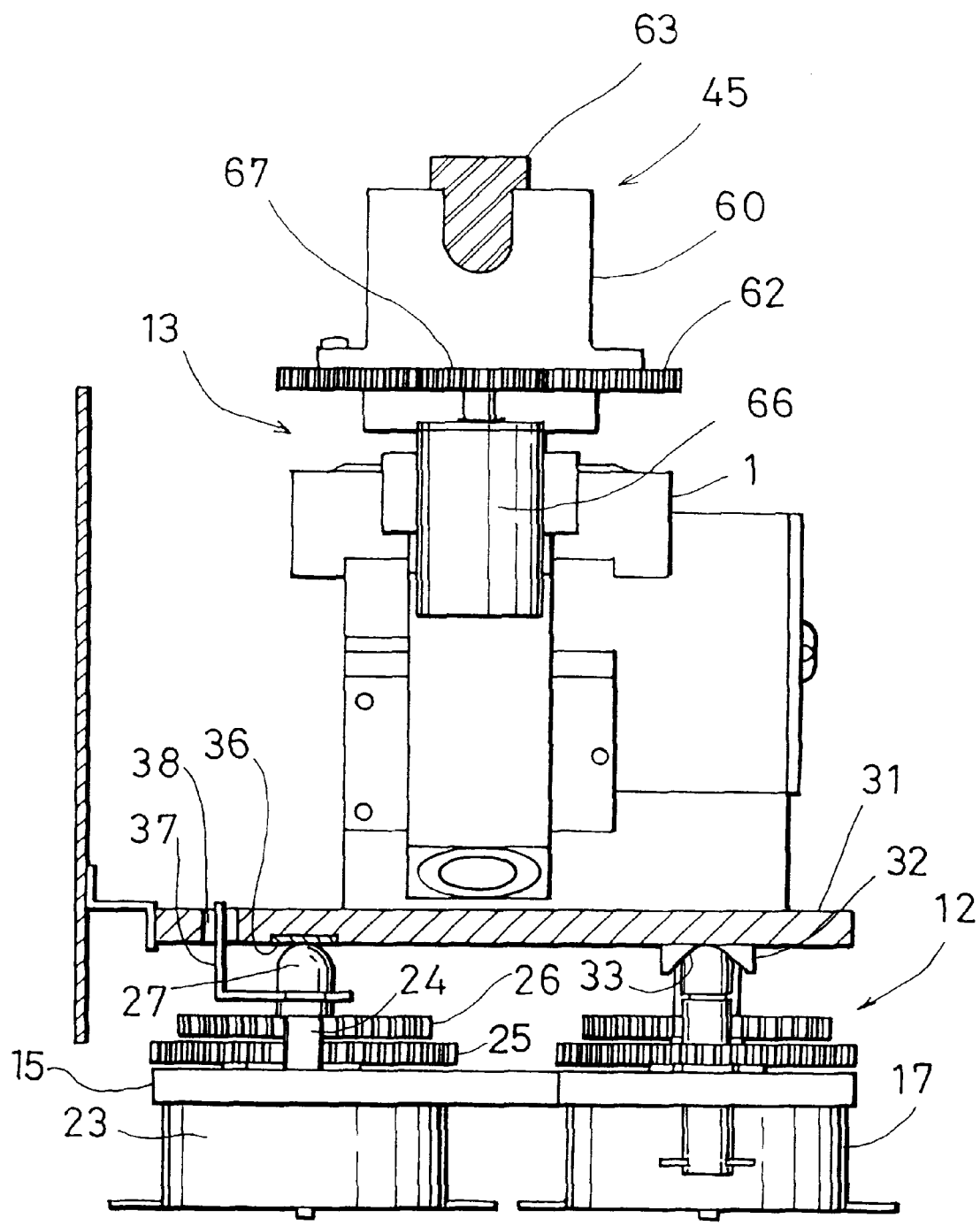
FIG. 2 is a side view of the embodiment of the present invention.

An optical axis compensator shown in FIG. 1 mainly comprises a tilting mechanism 12, a laser beam projecting optical system 13, and a control unit (to be described later).

First, description will be given on the tilting mechanism 12.

A fixed baseplate 15 is supported by four pedestals 16. On the lower surface of the fixed baseplate 15, a first tilting motor 17 is mounted and an output shaft of the first tilting motor 17 is protruded upward. A first driving gear 18 is engaged on the protruded end. A first driven gear 19 is rotatably mounted on the fixed baseplate 15, and the first driven gear 19 is engaged with the first driving gear 18 via a first reduction idle gear 20. At the center of the first driven gear 19, a nut is formed, into which a first tilting rod 21 is screwed with its upper end protruded, and the upper end of the first tilting rod 21 is formed in spherical shape.

A second tilting motor 23 is mounted on the lower surface of the fixed baseplate 15, and an output shaft of the second tilting motor 23 is protruded upward. A second driving gear 24 is engaged with the protruded end. On the fixed baseplate 15, a second driven gear 25 is rotatably mounted, and the second driven gear 25 is engaged with the second driving gear 24 via a second reduction idle gear 26. At the center of the second reduction idle gear 26, a nut is formed, into which a second tilting rod 27 is screwed with its upper end protruded, and the upper end of the second tilting rod 27 is formed in spherical shape.

A support column 29 is erected on the fixed baseplate 15 in such manner that the first tilting rod 21 and the second tilting rod 27 are positioned with equal spacing. The support column 29 and the first tilting rod 21 or the second tilting rod 27 are in such positional relationship that the support column 29 is positioned at the intersection of a rectangular coordinates, and the first tilting rod 21 and the second tilting rod 27 are positioned on the coordinate axes.

A tilting baseplate 31 is tiltably supported by the first tilting rod 21, the second tilting rod 27, and the support column 29, and the laser beam projecting optical system 13 is arranged on the tilting baseplate 31 via a hollow post 39 to be described later.

A V-block 32 is mounted on the tilting baseplate 31, and the upper end of the first tilting rod 21 is in contact with a V-groove 33 of the V-block 32. The center of the V-groove 33 is in a plane, which includes the axis of the first tilting rod 21 and the axis of the support column 29. On the first tilting rod 21, an L-shaped turn-stop hardware 34 is firmly fixed. A bent upper end of the turn-stop hardware 34 passes slidably through an oblong hole 35 formed in the tilting baseplate 31, and the oblong hole 35 restricts the movement of the turn-stop hardware 34 only in a rotating direction.

The upper end of the second tilting rod 27 slidably contacts a slide seat 36 firmly fixed on the lower surface of the tilting baseplate 31. On the second tilting rod 27, an L-shaped turn-stop hardware 37 is fixed. A bent upper end of the turn-stop hardware 37 passes slidably through an oblong hole 38 formed in the tilting baseplate 31, and the oblong hole 38 restricts the movement of the turn-stop hardware 37 only in a rotating direction.

On the tilting baseplate 31, a hollow post 39 concentric with the support column 29 is erected, and a spherical seat 41 is engaged with the inner upper end of the hollow post 39. The upper end of the support column 29 is finished in spherical shape, and the upper end is engaged with the spherical seat 41 so that the tilting baseplate 31 can be tilted around the spherical seat 41.

A spring 42 is stretched between the fixed baseplate 15 and the tilting baseplate 31, pressing the V-block 32 against the upper end of the first tilting rod 21 and pushing the slide seat 36 against the upper end of the second tilting rod 27.

Now, description will be given on the laser beam projecting optical system 13.

The laser beam projecting optical system 13 comprises an optical axis compensating unit 44 and a laser beam emitter 45. On the upper end of the hollow post 39, the optical axis compensating unit 44 having optical path of inverted V-shape is arranged. Further, there are provided a laser beam emitter 45 having optical axis in a vertical direction, and a tilt detection system 46 having an optical axis perpendicular to the optical axis of the optical axis compensating unit 44.

Above a compensator block 47 arranged on the hollow post 39, a liquid sealing container 1 is provided, and transparent liquid 14 to form a free liquid surface 2 is sealed inside the liquid sealing container 1.

The liquid sealing container 1 is designed in approximately inverted triangular shape, and an entry window 48 is provided on one inclined surface, and an exit window 49 is provided on the other inclined surface. There is provided a light source unit 50 to project a laser beam toward the free liquid surface 2 obliquely from below.

The light source unit 50 comprises a light source 3 and a collimator lens 4 on a projection optical axis, and the collimator lens 4 is held by a lens holder 75 and is mounted on the compensator block 47.

The lens holder 75 comprises a spherical unit 76 and a flange unit 77 spreading around the spherical unit 76. The spherical unit 76 is in contact with a conical recess 78 formed on the compensator block 47, and the lens holder 75 can be freely tilted around the spherical unit 76. The lens holder 75 is mounted on the compensator block 47 via a fixing plate 81, and the fixing plate 81 is fixed on the compensator block 47 by a fixing screw 79. In the fixing plate 81, a setscrew 80 pressing the flange unit 77 is screwed. When the spherical unit 76 is kept in contact with the conical recess 78 and the setscrew 80 is turned at an adequate position after the flange unit 77 is fixed on the fixing plate 81 by the fixing screw 79, angular adjustment of the optical axis of the collimator lens 4 can be performed.

The light source 3 is held by a light source holder 82, and it is engaged and fixed in the lens holder 75.

Along a reflection optical axis of the laser beam reflected by the free liquid surface 2 and irradiated through the exit window 49, an anamorphic optical system 53 comprising optical components (such as wedge prisms) 51 and 52 is arranged, and a reflection mirror 54 is provided for reflecting the laser beam coming through the anamorphic optical system 53 in a vertical direction. On an exit optical axis of the laser beam reflected by the reflection mirror 54, a beam expander 57 comprising convex lenses 55 and 56 is disposed.

The laser beam emitter 45 is arranged on the exit side of the beam expander 57. A laser beam emitter barrel 59 coaxial with the beam expander 57 is fixed on the compensator block 47, and a rotation block 60 is rotatably mounted on the laser beam emitter barrel 59 via a bearing 61. On the rotation block 60, a driven gear 62 is fixed and a pentagonal prism 63 for deflecting the exit optical axis of the laser beam in a horizontal direction is disposed.

On the laser beam emitter barrel 59, a rotation motor 66 is mounted via a motor support hardware 65, and a driving gear 67 engaged with an output shaft of the rotation motor 66 is engaged with the driven gear 62. When the rotation motor 66 is driven to rotate, the rotation block 60 is rotated around a vertical axis via the rotation motor 66 and the driven gear 62.

Between the anamorphic optical system 53 and the exit window 49 along the reflection optical axis of the light irradiated from the exit window 49, a plate glass 69 serving as light beam splitting means is arranged at an angle of 45° with respect to the reflection optical axis, and a part of the reflected laser beam is split by the plate glass 69 and is guided toward the tilt detection system 46.

Figure 4:
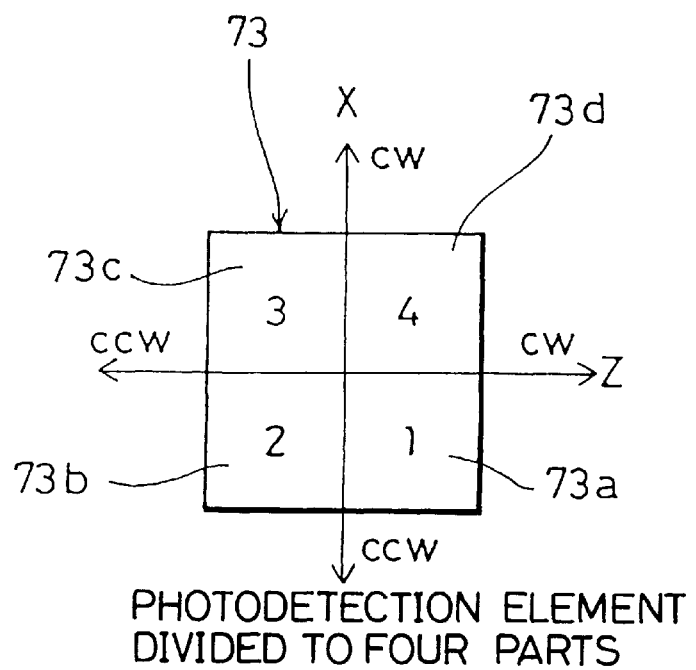
FIG. 4 is an arrow diagram along the line B in FIG. 3.

The tilt detection system 46 comprises a condenser lens system 72 containing a convex lens 70 and an aperture lens 71, and a photodetection element 73, and the condenser lens system 72 converges the laser beam on the photodetection element 73. As shown in FIG. 4, the photodetection element 73 is divided to four equal parts like matrix, and each of photodetection units 73a, 73b, 73c and 73d thus divided independently detects photodetection signal.

Figure 5:
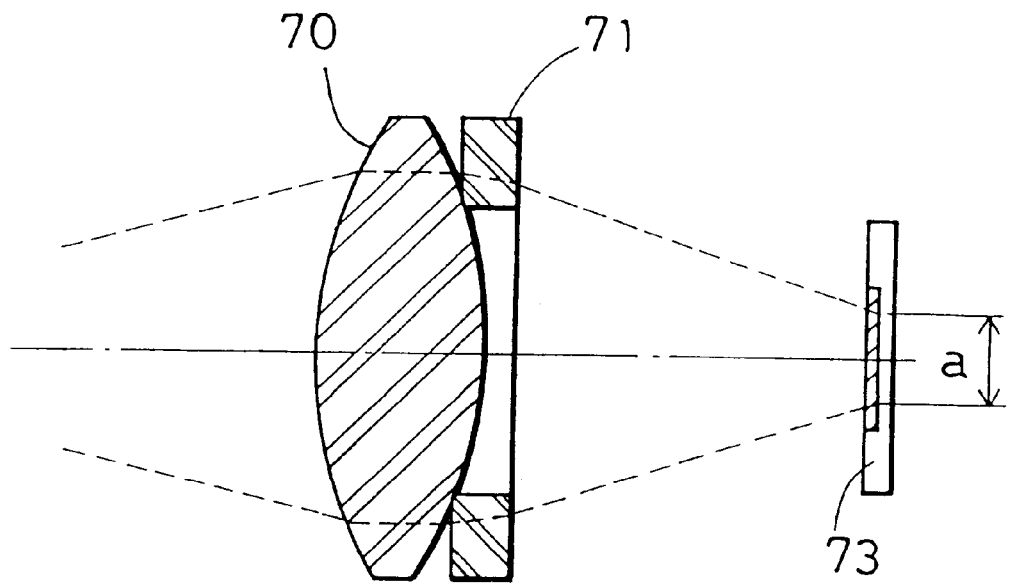
FIG. 5 is a drawing to show an optical system of a tilt detection system in the above embodiment.
Figure 6:
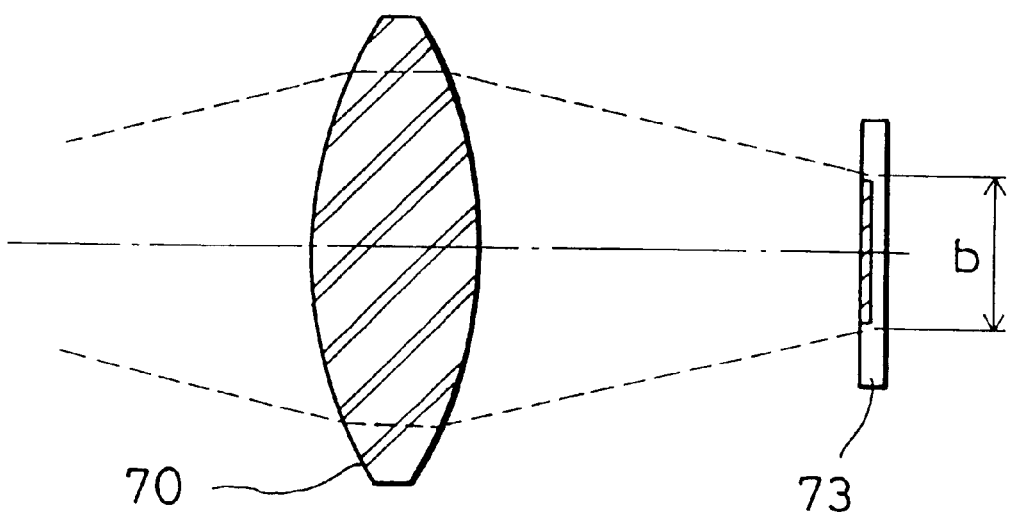
FIG. 6 is a drawing to show a comparative example of the optical system of the tilt detection system as described above.

As shown in FIG. 5, the aperture lens 71 further refracts the light beam, which has passed through peripheral portion of the convex lens 70, and the light beams are converged on the photodetection element 73. FIG. 6 shows refraction status of the optical axis of the light beam, which has passed through the peripheral portion of the convex lens 70 when the aperture lens 71 is not present. It is supposed that amount of deviation of convergent position of the photodetection element 73 is "b" when the optical axis of the light beam passing through the convex lens 70 is tilted with respect to the optical axis of the convex lens 70, and that it is "a" when the aperture lens is present. The light beam passing through the aperture lens 71 is the same as that of the case where the focal length is shorter by refracting. The positional relationship from the light spot to the image point in the same distance is a <b as shown in the figure, and it is possible to reduce the size of the photodetection element 73.

Figure 7:
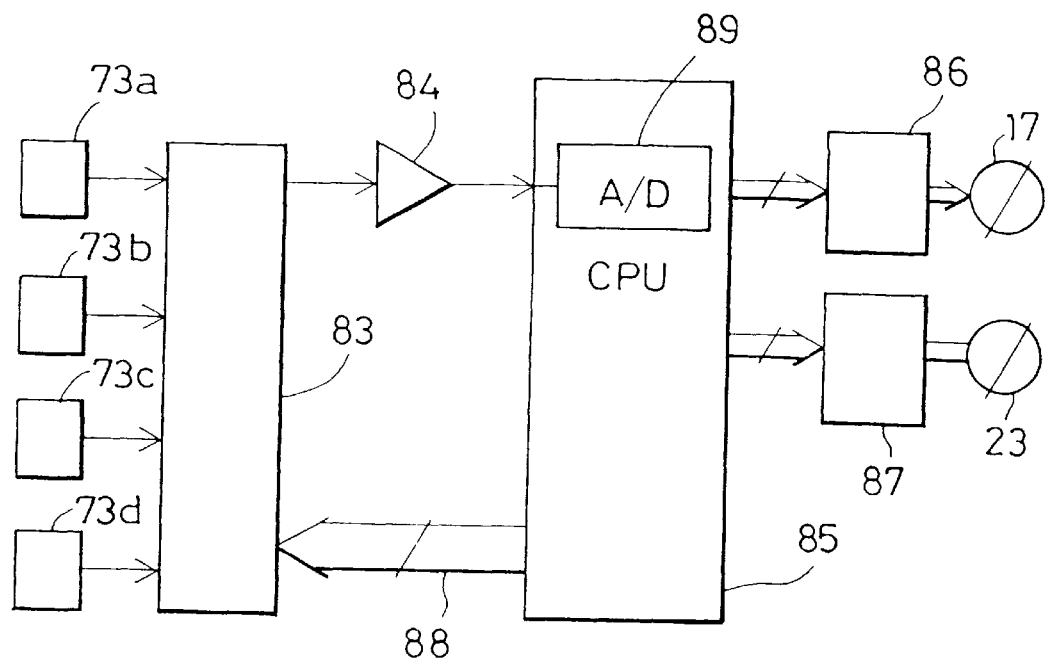
FIG. 7 is a control block diagram of a tilting mechanism in the above embodiment.

FIG. 7 is a schematical block diagram showing a control unit, which performs leveling of the tilting mechanism 12.

Analog signals from the photodetection units 73a, 73b, 73c, and 73d are inputted to a multiplexer 83. An arithmetic unit 85 issues a select signal 88 to the multiplexer 83. Based on the select signal 88 from the arithmetic unit 85, the multiplexer 83 selects the signals from the photodetection units 73a, 73b, 73c, and 73d and sequentially incorporates these signals, and these are outputted to an amplifier 84 as a series of signals.

The arithmetic unit (CPU) 85 comprises an A/D converter 89, a position identifier (not shown), and a light quantity identifier (not shown). The signal inputted from the amplifier 84 is turned to digital signal by the A/D converter 89. Based on the digital signal, a position of the laser beam is identified by the position identifier and the light quantity identifier, and a drive control signal is issued to a first motor driving circuit 86 and a second motor driving circuit 87 in such manner that the position of projection is at the center of the photodetection element 73. The light quantity identifier identifies the light quantity as described later from each of the digital signals. Based on the light quantity, a drive control signal is outputted to the first motor driving circuit 86 and the second motor driving circuit 87 so that the position of projection will be at the center of the photodetection element 73.

Based on the drive control signal from the arithmetic unit 85, the first motor driving circuit 86 and the second motor driving circuit 87 drive the first tilting motor 17 and the second tilting motor 23.

Figure 8:
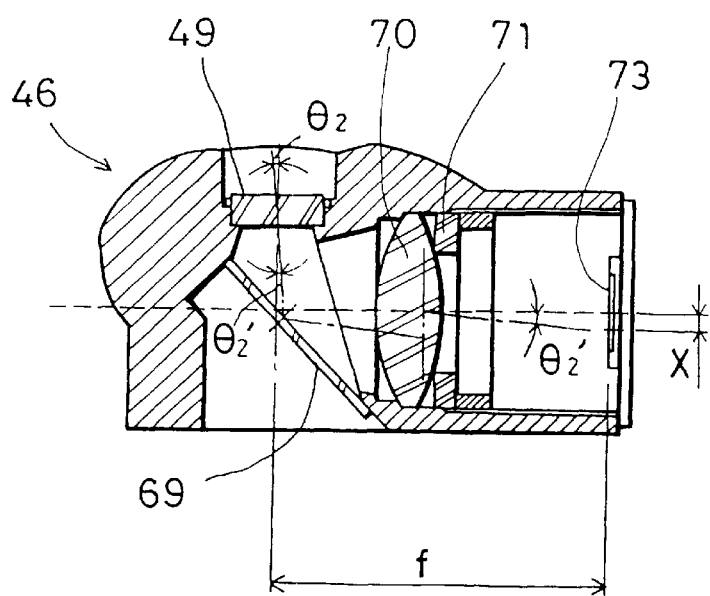
FIG. 8 is a drawing to explain operation of the tilt detection system in the above embodiment.

Next, description will be given on shifting of an image forming position of the light beam on the photodetection element 73 in case the free liquid surface 2 is tilted with respect to the optical axis referring to FIG. 8.

It is supposed that a distance from the reflection optical axis of the light beam reflected by the free liquid surface 2 to the photodetection element 73 is a focal distance f, and that an axis in a direction perpendicular to the liquid surface is Y-axis and axes in two directions perpendicular to the Y-axis are X-axis and Z-axis respectively. When the free liquid surface 2 is at a horizontal position, the point of projection of the laser beam is at the intersection of X- and Z-axes.

It is supposed that a reflection angle is $\theta_1$ when the free liquid surface 2 is tilted at an angle of $\alpha$ around X-axis, and a reflection angle is $\theta_2$ when the free liquid surface 2 is tilted at an angle of $\theta$ around Z-axis. Then, $$\theta_1 = 2\alpha \quad (1)$$

$$\theta_2 = \cos^{-1}(\cos^2\theta \cdot \cos 2\alpha + \sin^2\theta) \quad (2)$$

An exit angle after the liquid sealing container is:

$$\theta_1' = n\theta_1 \quad (3)$$

$$\theta_2' = n\theta_2 \quad (4)$$

where n represents a refractive index of the liquid, and $\theta$ is an incident angle to the liquid.

As described above, the angle of $\theta_1'$, the angle of $\theta_2'$ and the deflected optical axis are also maintained in the optical axis split by the plate glass 69, and it enters the condenser lens 70.

Therefore, displacement $X_1$ of the image forming position at the light convergence position f in case the liquid surface is tilted around X-axis and displacement $X_2$ of the image forming position in case it is tilted around Z-axis are expressed as follows:

$$X_1 = f \cdot \tan \theta_1' \quad (5)$$

$$X_2 = f \cdot \tan \theta_2' \quad (6)$$

and the entire arrangement is shifted from the image forming position where the arrangement is based on an approximately horizontal position.

The symbol f represents a numeral value already known, and the values of $X_1$ and $X_2$ can be detected from the photodetection element 73. From the above equations (5) and (6), tilting $\theta_1'$ and $\theta_2'$ of the free liquid surface 2 can be calculated. Based on the results of calculation, the first tilting motor 17 and the second tilting motor 23 are driven, and the laser beam projecting optical system 13 can be leveled to horizontal status. In the final optical axis compensation, the optical axis is optically compensated in a vertical direction by the anamorphic optical system 53 and the beam expander 57. The light beam is deflected by the pentagonal prism 63 and is projected so that a reference line in a horizontal direction can be formed. By rotating the rotation block 60 via the driving gear 67 and the driven gear 62 using the rotation motor 66, a horizontal reference plane can be formed.

Figure 9:
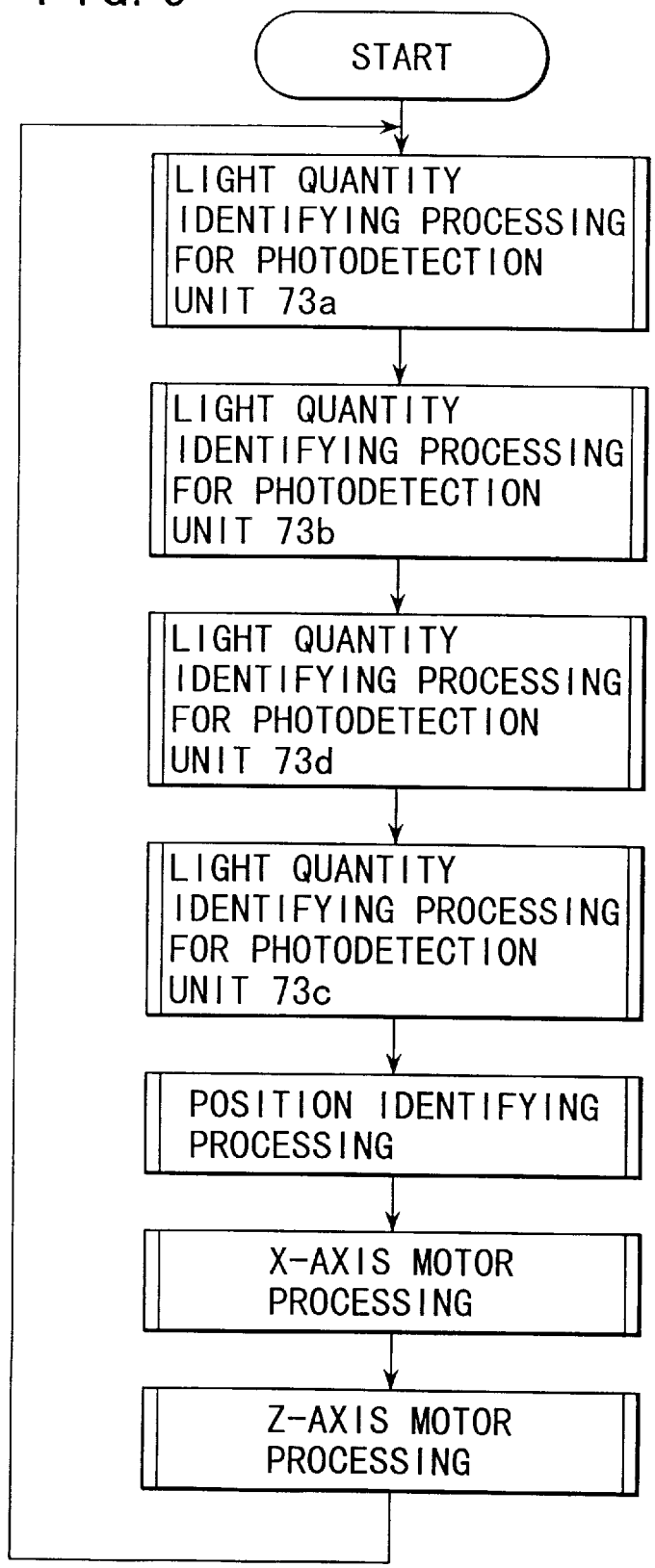
FIG. 9 is a flow chart to show operation of the tilt detection system in the above embodiment.
Figure 10:
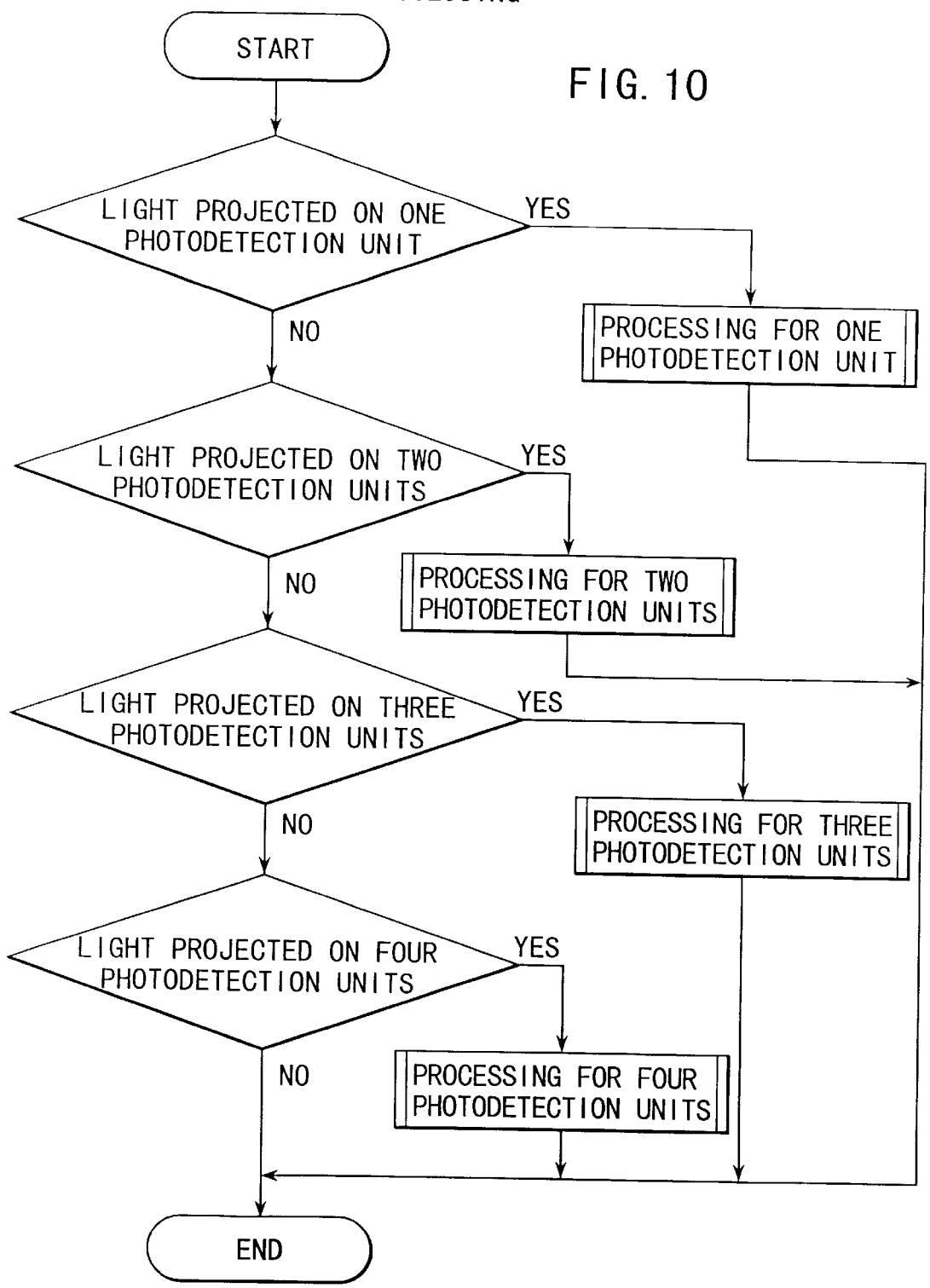
FIG. 10 is a flow chart to show operation of the tilt detection system in the above embodiment.

Description will be given further on leveling operation by the tilting mechanism 12 referring to FIG. 9 and FIG. 10.

In the processing of photoelectric conversion at the photodetection unit 73a, the select signal 88 is inputted to the multiplexer 83 by the arithmetic unit 85. Among the units of the photodetection element 73, the multiplexer 83 incorporates a photodetection signal from the photodetection unit 73a. The photodetection signal is amplified by the amplifier 84 and is inputted to the A/D converter 89. Upon receipt of an instruction from the arithmetic unit 85, it is converted to a digital signal. In case a digitized light quantity signal is present, it is judged whether the light quantity is over a predetermined level or not, i.e. whether it is over the level (threshold level) not identified as noise or not. As the result of the identification, if it is more than the threshold level, 1 is added to a "number of signals present" buffer memory to indicate that the signal is present, and the presence of light quantity in the photodetection unit 73a is stored in a "position information" buffer memory, and digital value of the light quantity is also saved.

Next, the select signal 88 is inputted to the multiplexer 83 from the arithmetic unit 85, and the multiplexer 83 selects and incorporates the photodetection signal from the photodetection unit 73b. For the subsequent signal processing, the procedure is the same as described above, and detailed description is not given here. Similarly, the same processing is performed on the photodetection units 73c and 73d.

When a series of signal processing has been completed on the photodetection units 73a, 73b, 73c and 73d, the position of projection point of the laser beam on the photodetection element 73 is identified.

Description will be given now on processing to identify the position of the projection point of the laser beam referring to FIG. 10 and FIG. 4.

Based on the information obtained in the photodetection signal processing from the photodetection element 73, the first tilting motor 17 and the second tilting motor 23 are driven in a predetermined direction via the first motor driving circuit 86 and the second motor driving circuit 87.

First, in case there is a signal obtained in the photodetection signal processing, it is identified whether the number on the "signals present" buffer memory is one, two, three or four.

In case the number on the "signals present" buffer memory is one, it is judged according to the "position information" buffer memory as to on which of the photodetection units 73a, 73b, 73c or 73d the projection position of the laser beam is located. Information such as a moving direction toward adjacent X-axis and Z-axis and amount of displacement are calculated, and these are outputted to the first motor driving circuit 86 and the second motor driving circuit 87. For example, in case the projection position is on the photodetection unit 73a, it is judged that displacement is toward the direction "cw" with respect to X-axis direction and toward the direction "ccw" with respect to Z-axis, and the first tilting motor 17 and the second tilting motor 23 are driven and rotated in the predetermined direction via the first motor driving circuit 86 and the second motor driving circuit 87.

In case the number on the "signals present" buffer memory is two, it is judged based on the "position information" buffer memory as to on which of the photodetection units 73a, 73b, 73c or 73d the projection position of the laser beam is located. Next, by comparing two photodetection values, information is issued such as a direction of displacement toward two axes, displacement and stopping. For example, in case the projection position is on the photodetection units 73a and 73b, two light quantities (73a and 73b) are compared with each other. If the light quantities are equal to each other, judgment is issued to stop with respect to Z-axis, and to move toward the direction "cw" with respect to the X-axis, and the first tilting motor 17 and the second tilting motor 23 are driven and rotated in the predetermined directions.

The first tilting motor 17 and the second tilting motor 23 are driven and rotated in the predetermined direction, i.e. in the direction "ccw" with respect to Z-axis in case the light quantity (73*a*)>the light quantity (73*b*) and in the direction "cw" with respect to Z-axis in case the light quantity (73*a*)<the light quantity (73*b*).

In case the number on the "signals present" buffer memory is three, it is judged based on the "position information" buffer memory as to on which of the photodetection units 73*a*, 73*b*, 73*c* or 73*d* the projection position of the laser beam is located, and information is issued such as directions and amount of displacement toward the two axes. For example, in case the projection position is on the photodetection units 73*a*, 73*b* and 73*c*, information of displacement is issued toward the direction "cw" with respect to X-axis direction and toward the direction "cw" with respect to Z-axis direction.

In case the number on the "signals present" buffer memory is four, the value obtained by adding the light quantity (73*a*) and the light quantity (73*d*) is compared with the value obtained by adding the light quantity (73*b*) and the light quantity (73*c*), and information is outputted such as displacement toward Z-axis direction and stopping.

Further, the value obtained by adding the light quantity (73*a*) and the light quantity (73*b*) is compared with the value obtained by adding the light quantity (73*c*) and the light quantity (73*d*), and information is outputted such as displacement toward X-axis direction and stopping.

For example, with respect to Z-axis, the information to stop is issued in case [the light quantity (73*a*)+the light quantity (73*d*)] is approximately equal to [the light quantity (73*b*)+the light quantity (73*c*)]. The information to move toward the direction "ccw" is issued in case [the light quantity (73*a*)+the light quantity (73*d*)>the light quantity (73*b*)+the light quantity (73*c*)], and the information to move toward the direction "cw" is issued in case [the light quantity (73*a*)+the light quantity (73*d*)<the light quantity (73*b*)+the light quantity (73*c*)].

With respect to X-axis, the information to stop is issued in case [the light quantity (73*a*)+the light quantity (73*b*)] is approximately equal to [the light quantity (73*c*)+the light quantity (73*d*)], to move toward the direction "cw" in case [the light quantity (73*a*)+the light quantity (73*b*)>the light quantity (73*c*)+the light quantity (73*d*)], and to move toward the direction "ccw" in case [the light quantity (73*a*)+the light quantity (73*b*)<the light quantity (73*c*)+the light quantity (73*d*)].

By the above position identifying processing, information is obtained such as directions toward Z-axis or X-axis, moving, or stopping. The information thus obtained is outputted to the first motor driving circuit 86 and the second motor driving circuit 87.

The first motor driving circuit 86 drives the first tilting motor 17 and moves the first tilting rod 21 up or down by a predetermined amount via the first driving gear 18, the first reduction idle gear 20 and the first driven gear 19. Further, a tilting baseplate 31 is tilted around a line, which connects the top of the support column 29 with the top of the second tilting rod 27. Further, the second motor driving circuit 87 moves the second tilting rod 27 up or down in similar manner and tilts it around a line, which connects the top of the support column 29 with the top of the first tilting rod 21. Thus, the laser beam projecting optical system 13 is leveled toward a horizontal direction.

When the leveling operation by the tilting mechanism 12 has been completed, the optical axis compensating unit 44 is turned in an approximately horizontal direction and it is within a range of automatic compensation based on the transparent liquid 14. Thus, an optical axis is compensated by the optical axis compensating unit 44, and the laser beam projected from the laser beam emitter 45 is turned toward a horizontal direction.

Figure 11:
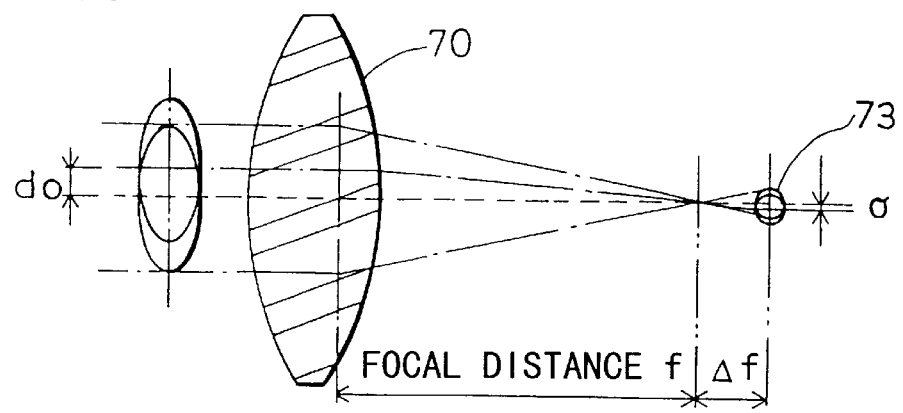
FIG. 11 is a drawing to explain the optical system of the tilt detection system in the above embodiment.

In the above embodiment, if semiconductor laser is used as the light source, the image of the light source is extremely minimized. In case position detection is performed on the photodetection element divided to four parts, it is based on the assumption that the light source image has a certain area, and it may be difficult sometimes to detect the exact position. In such case, as shown in FIG. 11, the photodetection element 73 may be moved by a distance Δf. By selecting an adequate value for the distance Δf, it is possible to change the size of the light source image (the size of the spot light) as desired.

In this case, it is possible to select the size of the spot by moving it from the focal point by a distance Δf and to arrange it on the four-divided units (photodetection element 73). However, in case the photodetection element 73 is at the image forming position, even when reflection point is moved due to displacement of the free liquid surface 2 caused by expansion and contraction of the transparent liquid 14, there is no influence on the deviation of the optical axis. However, in case the photodetection element 73 is moved from the focal point as shown in FIG. 11, deviation occurs on the photodetection element 73. As shown in FIG. 11, the deviation σ is expressed by:

$$\sigma = \Delta f \cdot (do/f) \tag{7}$$

where Δf represents displacement from the focal point, and "do" represents optical axis deviation when the liquid is expanded.

In case the image forming position is changed according to this deviation, it is difficult to identify whether this has been caused by deviation angle of the optical axis due to tilting of the actual arrangement or by the above deviation. Therefore, there will be no trouble in practical application if detecting means is arranged at such position that the amount of influence of the above value σ is reduced with respect to the resolution when the approximately horizontal position is detected.

To enlarge the spot, there is also a method to arrange a diffusion plate in front of the photodetection element 73 and to detect the light source image as being larger as it is. In this case, if it is compared with the method to move the photodetection element 73 from the focal point as described above, it is possible to detect the diffusion image by arranging the diffusion plate in front of a sensor. Thus, the value of σ with respect to the optical axis deviation when the liquid is expanded or contracted can be minimized.

As described above, when the photodetection element 73 is divided to four parts of the photodetection units 73*a*, 73*b*, 73*c* and 73*d*, and it is judged as to which of the photodetection units detects the light, and in case the projected light source image spans over two or more photodetection units, the position is identified by comparing the photodetection amount of the photodetection units. Accordingly, there is no need to judge the position of the projected light source image within each of the photodetection units. For this reason, expensive photodetection element such as CCD is not required, and an element such as P.S.D. (position sensitive detector) may be used.

Figure 12:
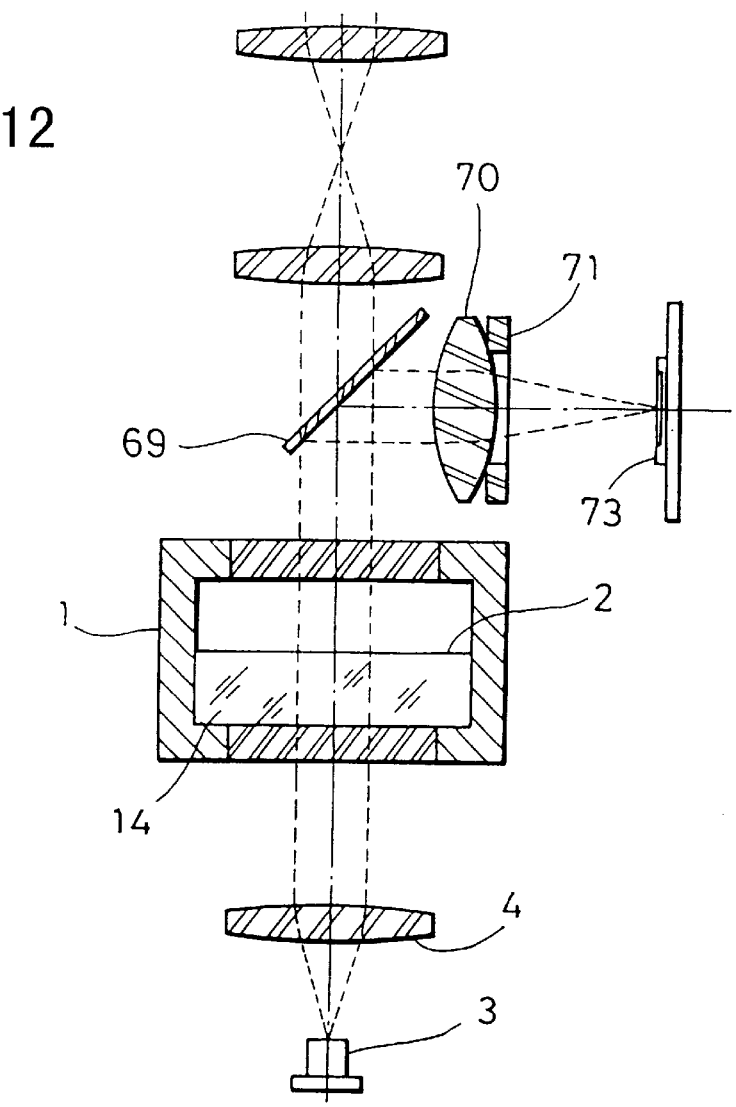
FIG. 12 is a drawing to explain an essential portion of another embodiment.

In the above, description has been given on an optical axis compensator of free liquid surface reflection type. In an optical axis compensator of transmission type based on wedge-like change of liquid as shown in FIG. 12, it is also possible to attain the purpose by arranging the plate glass 69, the convex lens 70, the aperture lens 71, and the photodetection element 73 as described above along the optical axis after the light has passed through the liquid.

As the light beam splitting means, a beam splitter or a half-mirror may be used instead of the plate glass 69. Further, as described above, the level of the free liquid surface 2 is changed due to expansion and contraction of the transparent liquid 14. As a result, the reflection point is changed, and the optical axis is shifted. By arranging the photodetection element 73 at focal point, it is possible to exclude the influence due to the change of environmental temperature.

Figure 3:
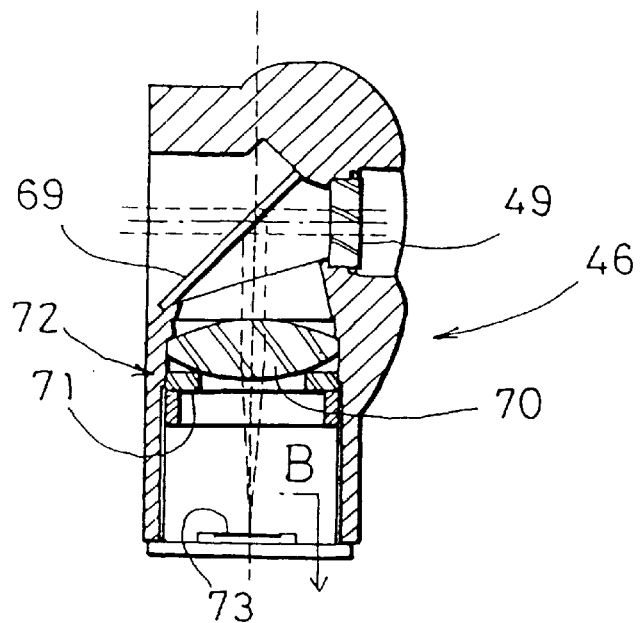
FIG. 3 is an arrow diagram along the line A in FIG. 1.
Figure 13:
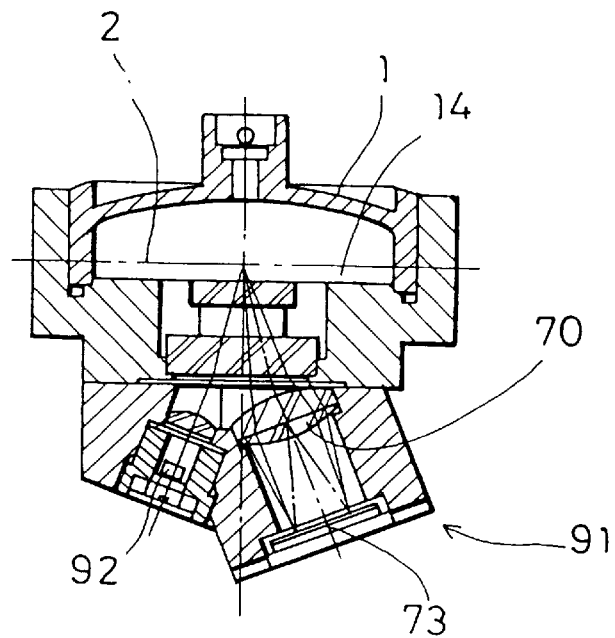
FIG. 13 is a drawing to explain an essential portion of another embodiment and is an arrow diagram along the line C in FIG. 1.
Figure 14:
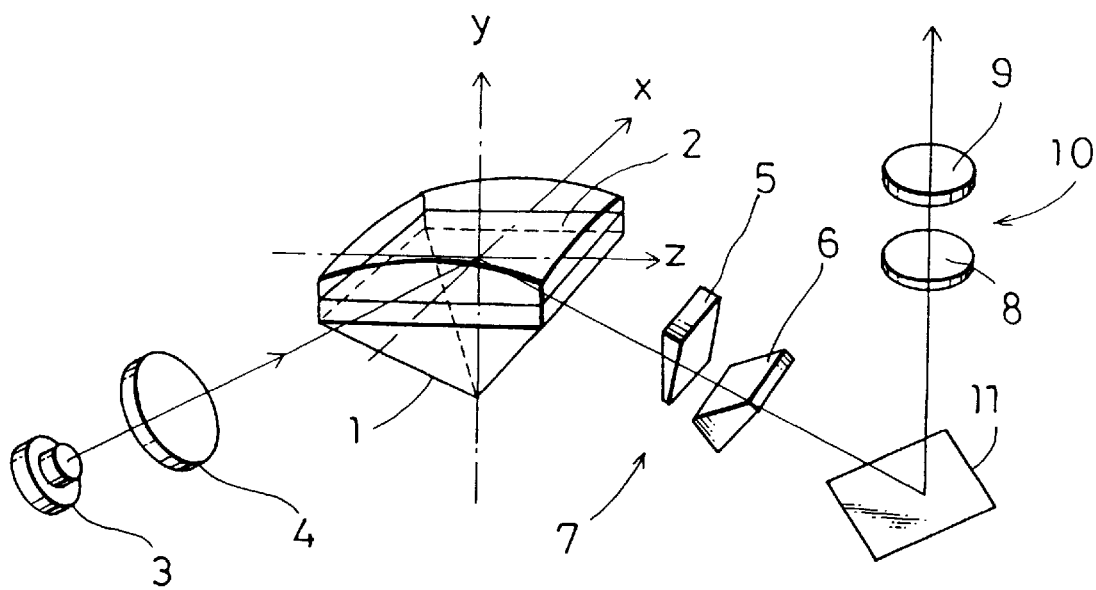
FIG. 14 is a drawing of an optical axis compensator utilizing free liquid surface.

Further, in the above embodiment, a part of the projecting light beam is split to detect the posture of the laser beam projecting optical system 13 to perform the leveling operation, while a tilt detector 91 for leveling operation may be separately provided. FIG. 13 shows a case where there is separately provided the tilt detector 91 having an optical axis on a plane, which crosses a plane containing the optical axis of the optical axis compensating unit 44 without splitting a part of the projecting light beam. In FIG. 13, the same component as in FIG. 3 is referred by the same symbol.

On the free liquid surface 2, the light beam is projected from a light source 92 for tilt detection, and it is reflected by the free liquid surface 2. The reflected light beam passes through a convex lens 70, and an image is formed on the photodetection element 73. The photodetection element 73 is divided into four parts as matrix as described above, and each of the divided photodetection units 73a, 73b, 73c and 73d independently detects the photodetection signal. The tilt detection is the same as described above, and detailed description is not given here.

Further, as the means for tilt detecting, a tilt detector using a bubble tube as commercially marketed may be provided on the laser beam projecting optical system 13, and this may be used to perform the leveling operation of the tilting mechanism 12 according to output signal from a tilt sensor. A cylindrical lens system or a toric lens may be used as the anamorphic optical system in the embodiment.

As described above, according to the present invention, optical axis of the optical system is mechanically leveled using the tilting mechanism. As a result, automatic compensation can be achieved in such extent that it far exceeds the range of optical axis compensation of the optical system. Because the tilting mechanism is designed in simple construction and it has no such structure or components, which require high accuracy and high precision, it is advantageous in that it can be obtained at low cost and that it has high durability.

What we claim is:

1. An optical axis compensator, comprising a liquid sealing container with a transparent liquid sealed therein so as to form a free liquid surface, an optical axis compensating unit for allowing a light beam to pass through the liquid sealing container at a predetermined angle and for performing optical axis compensation within a range based on changes of an exit optical axis according to angular change of said free liquid surface with respect to an incident optical axis, a tilting mechanism for tilting said optical axis compensating unit, tilt detecting means for detecting tilt of said optical axis compensating unit to the extent that said range of optical axis compensation that said optical axis compensating unit can perform is exceeded, and a control unit for driving said tilting mechanism according to a signal from said tilt detecting means and for tilting said optical axis compensating unit within the broadest range of optical axis compensation.

2. An optical axis compensator according to claim 1, wherein the light beam entering the transparent liquid is reflected by the free liquid surface.

3. An optical axis compensator according to claim 1, wherein the light beam entering the transparent liquid passes through the free liquid surface.

4. An optical axis compensator according to claim 1, wherein said tilt detecting means comprises splitting means for splitting the light beam from the optical axis compensating unit and light detecting means for detecting changes of the exit optical axis based on changes of tilt of a free liquid surface.

5. An optical axis compensator according to claim 1, wherein said tilt detecting means comprises a light source for tilt detecting and photodetection units for receiving a light beam from said light source for tilt detecting, and wherein said photodetection unit allows said light beam from said light source for tilt detection to pass through said liquid sealing container at a predetermined angle and detect the change of the optical axis of said light beam after passing through.

6. An optical axis compensator according to claim 1, wherein said tilt detecting means is a tilt detector using a bubble tube.

7. An optical axis compensator according to one of claims 4 or 5, wherein said light detecting means comprises photodetection units divided into four parts.

8. An optical axis compensator according to one of claims 4 or 5, wherein said light detecting means has a condenser lens for converging the light beam after passing through the transparent liquid toward the photodetection unit, and said condenser lens comprises a convex lens and an aperture lens.

9. An optical axis compensator according to claim 7, wherein said light detecting means has a diffusion plate, and said photodetection unit detects light through said diffusion plate.

10. An optical axis compensator according to one of claims 7 or 8, wherein said control unit comprises light quantity identifying means for identifying light quantity from said light detecting means and position identifying means for detecting a position of the light beam according to the signal from said photodetection unit divided into four parts, and the tilting mechanism is driven according to the results identified by said light quantity identifying means and said position identifying means.

11. An optical axis compensator according to claim 1, wherein said tilting mechanism supports said optical axis compensating unit at three points in such a manner that said tilting mechanism tiltably supports said optical axis compensating unit at two of said three points and around one of said three points as a fixed supporting point, so that said optical axis compensating unit is tilted within a range of the optical axis compensation.

12. An optical axis compensator according to claim 11, wherein each of said two supporting points comprises a first screw rod and a second screw rod respectively, and nuts screwed in said first screw rod and said second screw rod are rotated by a first tilting motor and a second tilting motor respectively, and said first tilting motor and said second tilting motor are driven and controlled by said control unit.

* * * * *